Nov. 20, 1923.
I. WAGNER
TRAP
Filed April 17, 1922
1,474,805
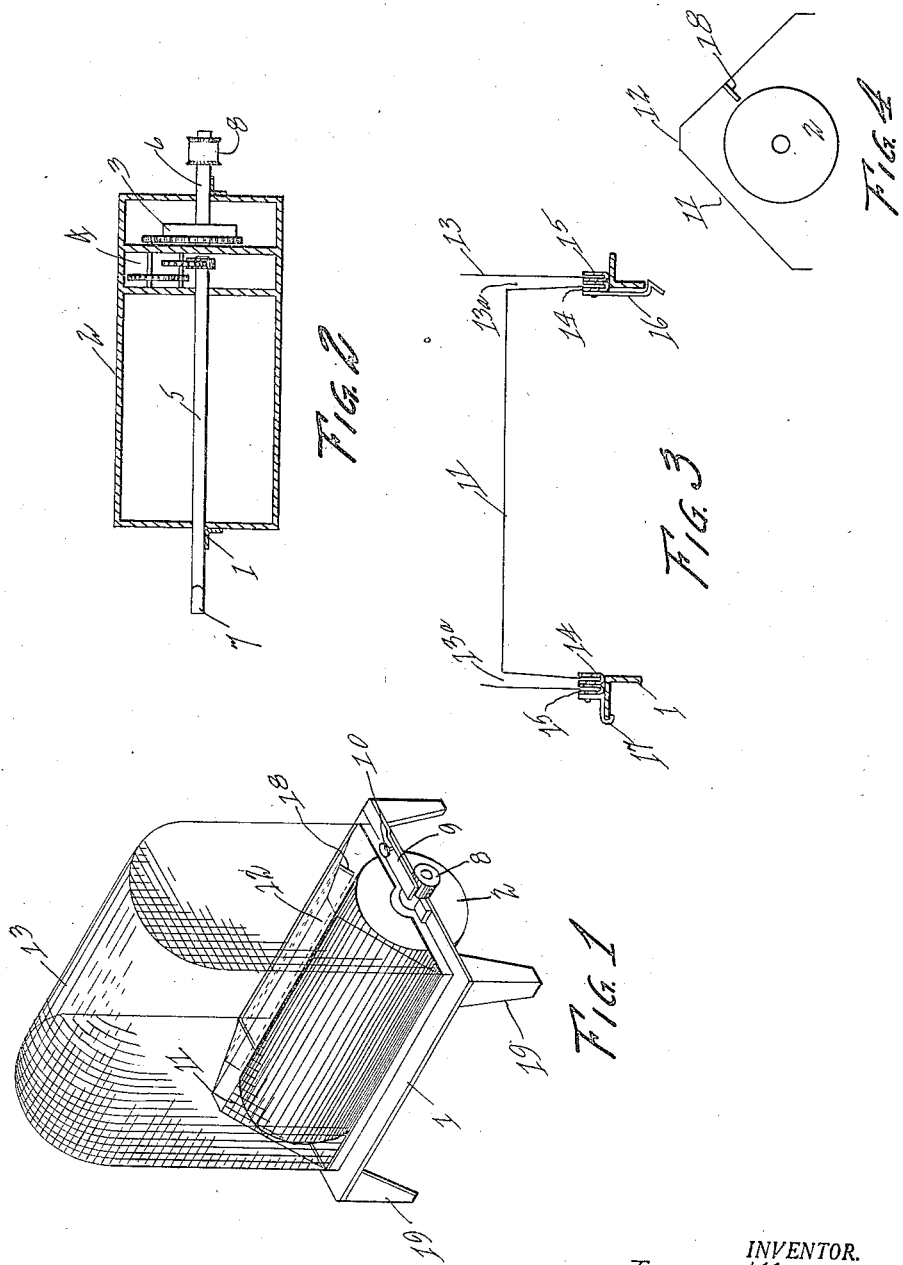
INVENTOR.
ISAAC WAGNER
BY
ATTORNEYS.

Patented Nov. 20, 1923.

1,474,805

UNITED STATES PATENT OFFICE.

ISAAC WAGNER, OF WALLA WALLA, WASHINGTON.

TRAP.

Application filed April 17, 1922. Serial No. 553,948.

*To all whom it may concern:*

Be it known that I, ISAAC WAGNER, a citizen of the United States, residing at Walla Walla, in the county of Walla Walla and State of Washington, have invented certain new and useful Improvements in Traps, of which the following is a specification.

This invention relates to fly traps and has for its object to provide a trap that is not restricted as to size, that is simple to construct and that is highly efficient in operation.

With this and other objects in view reference is now had to the accompanying drawings in which—

Fig. 1 is a perspective view of the trap;

Fig. 2 is a sectional elevation of the cylinder;

Fig. 3 shows constructional details; and

Fig. 4 is a diagrammatic view showing the relative position of the cylinder, funnel shaped screen, and stop.

Having reference to the drawings like numerals refer to like parts throughout the several views and the numeral 1 refers to the frame upon which is rotatably mounted the cylinder 2.

The cylinder contains a spring actuated mechanism consisting of a spring barrel 3 and a train of gears 4 arranged in any suitable and approved manner to operate the cylinder which is supported on the shafts 5 and 6 respectively. The shaft 5 is designed at one end 7 to receive a key (not shown), and the shaft 6 carries at its outer end a brake wheel 8. A spring member 9 is attached at one end to the frame with its other end positioned to engage the said wheel, and is provided with a tension screw 10 whereby the speed of the cylinder may be regulated.

Above the cylinder is positioned a funnel shaped screen 11 having an opening 12 at its upper side or apex through which the fly enters the container 13. This shape of screen takes advantage of the natural characteristics of the fly to move upward resulting in its entrance into the container 13, however when the container becomes more or less filled they move in all directions in their efforts to escape, and to prevent having the opening in the apex in the path of their movement about the end wall of the container I have withdrawn the end pieces of the screen to provide a space 13ª between it and the container.

The funnel shaped screen is finished at its lower end preferably by being bound by a metal binding 14 which strengthens the edge and provides sufficient rigidity to receive slidably, and maintain by frictional resistance, the container which is similarly bound by the binding 15.

The binding 14 is provided with a spring catch 16 adapted to engage the frame 1, as shown in Fig. 3, and the binding 15 is provided with a hook 17 likewise adapted to engage the frame. The hooks 17 and catch 16 are positioned on opposite sides of the apparatus and by being attached to separate units of the trap provides a way to lift the container without disturbing the funnel shaped screen when desired, or they may both be removed at once.

The container 13 extends above the funnel shaped screen and forms with it a closed trap with the exception of the opening in the apex above mentioned.

Attached to the funnel shaped screen is a stop 18 positioned longitudinally of the cylinder and adjacent thereto.

Legs 19 are provided upon which the trap stands, or it may be suspended if desired as the action of the trap does not depend upon its position.

In use the cylinder is preferably covered with some substance attractive to the flies, and the mechanism is then wound and the cylinder set in motion; the spring member is then set by the tension screw 10 thus controlling the speed of the cylinder to a very few revolutions per minute.

The fly is now attracted to the cylinder and lighting thereon is carried by the movement of the cylinder towards the screen and against the stop when, becoming dislodged, it flies from the cylinder to the screen.

The trap is equally applicable to other insects and in the case of crawling insects a continuous path is provided from the cylinder to the container by the medium of the stop which acts as a bridge between the cylinder and the screen which in turn leads to the opening in the apex through which the insect may pass.

Having thus described my invention what

I claim and desire to secure by Letters Patent is—

In a fly trap, a base, a cylinder rotatably mounted in said base, a rotating means mounted within said cylinder, a brake, a funnel shaped screen provided with an opening at its apex, positioned adjacent to said cylinder, a spring catch attached to said funnel shaped screen and engageable with said frame, a stop, a screened container slidably mounted and frictionally retained on said funnel shaped screen, and hooks attached to said container and engageable with said frame, said hooks and said spring catch acting conjointly to attach the screen members to the said frame.

In testimony whereof, I affix my signature.

ISAAC WAGNER.